US010332178B1

(12) United States Patent
Hare (10) Patent No.: US 10,332,178 B1
(45) Date of Patent: Jun. 25, 2019

(54) REAL-TIME PATRON-ACTIVITY INFORMATION SYSTEM

(71) Applicant: Jaspal Singh Hare, Dallas, TX (US)

(72) Inventor: Jaspal Singh Hare, Dallas, TX (US)

(73) Assignee: Barferno LLC, Dallas, TX (US)

( * ) Notice: Subject to any disclaimer, the term of this patent is extended or adjusted under 35 U.S.C. 154(b) by 5 days.

(21) Appl. No.: 14/846,795

(22) Filed: Sep. 6, 2015

Related U.S. Application Data (60) Provisional application No. 62/050,159, filed on Sep. 14, 2014.

(51) Int. Cl.
| | |
|---|---|
| *G06Q 30/00* | (2012.01) |
| *G06Q 30/06* | (2012.01) |
| *G06Q 30/02* | (2012.01) |
| *H04W 4/021* | (2018.01) |

(Continued)

(52) U.S. Cl.
CPC ..... *G06Q 30/0623* (2013.01); *G06Q 30/0201* (2013.01); *G06Q 30/0252* (2013.01); *G06Q 30/0257* (2013.01); *G06Q 30/0261* (2013.01); *G06Q 30/0282* (2013.01); *H04L 12/2854* (2013.01); *H04W 4/021* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 2011/0058536 A1* | 3/2011 | Tsuchiya | H04W 48/18 370/338 |
| 2011/0071901 A1* | 3/2011 | Fries | G06Q 30/02 705/14.48 |

(Continued)

OTHER PUBLICATIONS

Weppner, Jens, Bluetooth Based Collaborative Crowd Density Estimation With Mobile Phones, Mar. 1, 2013, 2013 IEEE International Conference on Pervasive Computing and Communications (PerCom), pp. 193-200 (Year: 2013).*

*Primary Examiner* — Michael Misiaszek
*Assistant Examiner* — Timothy J Kang
(74) *Attorney, Agent, or Firm* — Slater Matsil, LLP (57) ABSTRACT

An activity-information system is provided. The system comprises an activity-information server and a plurality of activity-information devices. Activity-information devices may be proprietor devices (e.g., for bar owners/staff), affiliate devices (e.g., for club promoters or taxi drivers), or end-user devices (e.g., for patrons). The activity-information devices provide activity information (such as, a user's location or presence at a venue or within a district) to the activity-information server, which stores the activity information in an activity-information repository. The activity-information server then determines activity levels for venues and districts, which may be transmitted to devices. The activity-information device then may display activity level in an activity-information interface. The activity-information interface may comprise a map with highlighting and icons indicative of activity levels for districts and venues, respectively. In addition, activity-information interface may comprise a display area for display marketing information (such as promotions and coupons) related to venues.

2 Claims, 3 Drawing Sheets

(51) Int. Cl.
*H04L 12/28* (2006.01)
*H04W 12/06* (2009.01)

(56) References Cited

U.S. PATENT DOCUMENTS

| | | | | |
|---|---|---|---|---|
| 2011/0238476 | A1* | 9/2011 | Carr | G06Q 30/00 |
| | | | | 705/14.25 |
| 2013/0159331 | A1* | 6/2013 | Zhang | G06F 17/30241 |
| | | | | 707/758 |
| 2013/0311310 | A1* | 11/2013 | Zell | G06Q 20/20 |
| | | | | 705/15 |
| 2013/0347073 | A1* | 12/2013 | Bryksa | H04L 63/105 |
| | | | | 726/4 |
| 2015/0058171 | A1* | 2/2015 | Sandhu | G06Q 30/0631 |
| | | | | 705/26.63 |
| 2015/0124790 | A1* | 5/2015 | Seine | H04W 76/00 |
| | | | | 370/338 |
| 2015/0134418 | A1* | 5/2015 | Leow | G06Q 30/0205 |
| | | | | 705/7.34 |
| 2015/0235238 | A1* | 8/2015 | Babinowich | G06Q 30/0202 |
| | | | | 705/7.31 |
| 2015/0312760 | A1* | 10/2015 | O'Toole | H04L 67/02 |
| | | | | 455/411 |
| 2015/0324531 | A1* | 11/2015 | Alves De Inda | G06F 19/327 |
| | | | | 705/2 |
| 2016/0021578 | A1* | 1/2016 | Bostick | H04W 48/17 |
| | | | | 370/332 |

\* cited by examiner

REAL-TIME PATRON-ACTIVITY INFORMATION SYSTEM

CROSS-REFERENCE TO RELATED APPLICATIONS

This application claims the benefit of U.S. Provisional Application No. 62/050,159, which is hereby incorporated by reference in its entirety.

TECHNICAL FIELD

The present invention provides a system for determining and providing activity levels for venues (e.g., bars and restaurants). More particularly, activity-information devices detect and provide activity information (such as a user's presence at a venue or within a "\bar district) to an activity-information server. The activity information server determines activity levels (i.e., generally indicative of popularity) for venues and districts, which may be transmitted to activity-information devices for display in an activity-information interface.

BACKGROUND

Bars and restaurants are ubiquitous. Bar districts in cities often have dozens of bars and restaurants from which patrons can choose. Patrons typically desire to frequent bars and restaurants that have a high level of activity, i.e., generally speaking, bars and restaurants that are popular or "happening." On the other hand, some people prefer to go to bars and restaurants that have a low level of activity, i.e., generally uncrowded. Determining which bars or restaurants to visit can be challenging given the large number of venues from which to choose. Promotions or events at bars and restaurants are also important considerations for patrons when deciding on which venue to frequent.

Numerous websites and mobile applications provide listings of various bars and restaurants. Typically, such systems provide lengthy listing of all bars and restaurants in a metropolitan area. A disadvantage of such systems is that it takes a long time for a user to review the lengthy list of venues, and even then, the information provided is not sufficient to meaningfully differentiate venues. Another disadvantage of such systems is that they rely exclusively on manually-entered data that is infrequently updated. Thus, the data is often outdated and inaccurate. Still yet another disadvantage of such systems is that they do not provide information on bar districts or areas. Thus, such systems have limited utility.

Accordingly, patrons lack useful means for determining what are the "hot" districts and the "happening" venues within a metropolitan area. Patrons thus resort to word-of-mouth methods, e.g., text messaging or calling a friend and asking for recommendations. However, such word-of-mouth methods are inefficient the requesting party must manually provide information on their criteria. Word-of-mouth methods are further disadvantageous as they are only capable of providing information on a handful of venues of which a friend has knowledge. And, unless the friend happens to be present at the recommended venue, any information provided does not reflect current conditions. Word-of-mouth methods are also unreliable. The friends often does not know the name or location of the recommended venue. Moreover, such methods are unavailable when most needed and desired, e.g., when a person is travelling or vacationing to a new city.

As such, there is a need for a system for providing patrons with information on whether a venue is "happening" or uncrowded. Further, there is a need for such a system to provide accurate information that reflect current levels of activity. Still further, there is a need for such a system to provide information on promotions and events. Still further, there is a need for such a system to provide information on venues in a useful and intuitive manner that allows patrons to identify nearby venues and districts. Still further, there is a need for robust system that uses real-time data from a plurality of sources.

SUMMARY

The present invention(s) provides an activity-information system. The system comprises an activity-information server and a plurality of activity-information devices. Activity-information devices may be proprietor devices (e.g., for bar owners/staff), affiliate devices (e.g., for club promoters or taxi drivers), or end-user devices (e.g., for patrons). The activity-information devices transmit activity-information related to venues (e.g., bars and restaurants) and districts to the activity-information server, which stores activity information in an activity-information repository. Activity information includes, inter alia, location of a user or whether the user is present at a particular venue or within a particular district. The activity-information server then determines activity levels for venues and districts from the activity information and may transmit activity levels to activity-information devices. The activity-information device then may display activity levels in an activity-information interface. The activity-information interface may comprise a map with highlighting and icons indicative of activity levels for districts and venues. In addition, activity-information interface may comprise a display area for display marketing information (such as promotions and coupons) related to venues.

In the preferred embodiment, the activity level is indicative of the total number of people present at a venue or in a district. In other embodiments, the activity level is indicative the number of patrons present relative the capacity of a venue. In still other embodiments, the activity level is indicative of how "hot" or popular a venue is.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Additionally, as used herein, the term "substantially" is to be construed as a term of approximation.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. A processor, server, or device means one or more processors, servers, or devices, respectively, as is understood by one of ordinary skill in the art. Furthermore, it is considered that the design, development, and implementation details of all such code would be apparent to a person having ordinary skill in the art based upon a review of the present description of the invention.

Figure 1:
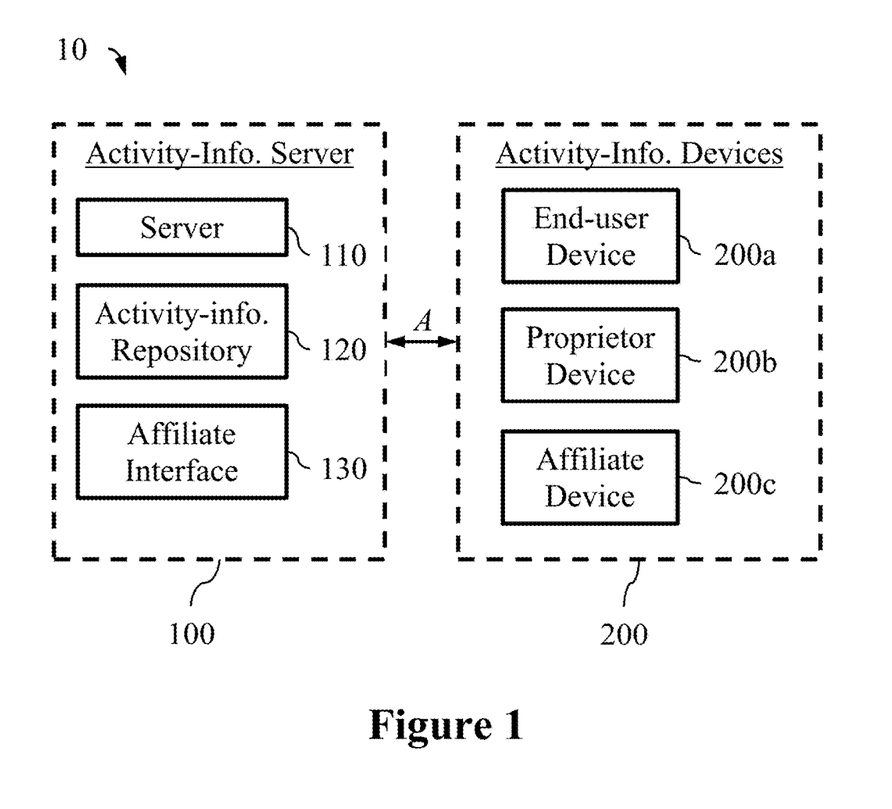
FIG. 1 is a block diagram of an activity-information system in accordance with a preferred embodiment of the present invention.

Referring to FIG. 1, activity-information system 10 is provided in accordance with a preferred embodiment of the present invention. Activity-information system 10 comprises activity-information server 100. Activity-information server 100 is communicatively coupled to activity-information device(s) 200, which may comprise end-user device(s) 200a, proprietor device(s) 200b, and third-party device(s) 200c. Activity-information device 200 provides activity information to activity-information server 100 via communications link (shown by the arrow A). Communications link may be provided over the Internet and/or cellular data network.

Activity-information server 100 comprises server 110, activity-information repository 120, and (optional) affiliate interface 130. Server 110 processes activity information receivable from activity-information devices 200. Activity-information repository 120 then stores the activity-information. Optionally, affiliate interface 130 is provided for receiving additional activity information directly from affiliate systems (not shown). For example, a taxi company may report activity information directly to activity-information server 100 through affiliate interface 130. Alternatively, a restaurant-reservations system may provide activity information (e.g., number of tables booked or available for booking).

Server 110, using activity information receivable from activity-information devices 200, determines activity levels for venues and districts as described in more detail below. The activity levels may then be stored in activity-information repository 120. Server 110 also may transmit activity levels (and certain activity information) to activity-information devices 200.

Additionally, activity-information server 100 may receive promotional information (such as coupons, event information, etc.) (also considered activity information) from activity-information devices 200 (e.g., proprietor devices 200b). Promotional information may be also stored in activity-repository 120. Promotional may be provided to activity-information devices 200 (see, e.g., FIG. 3, reference numerals 340a. 340b, and 340c).

Figure 2:
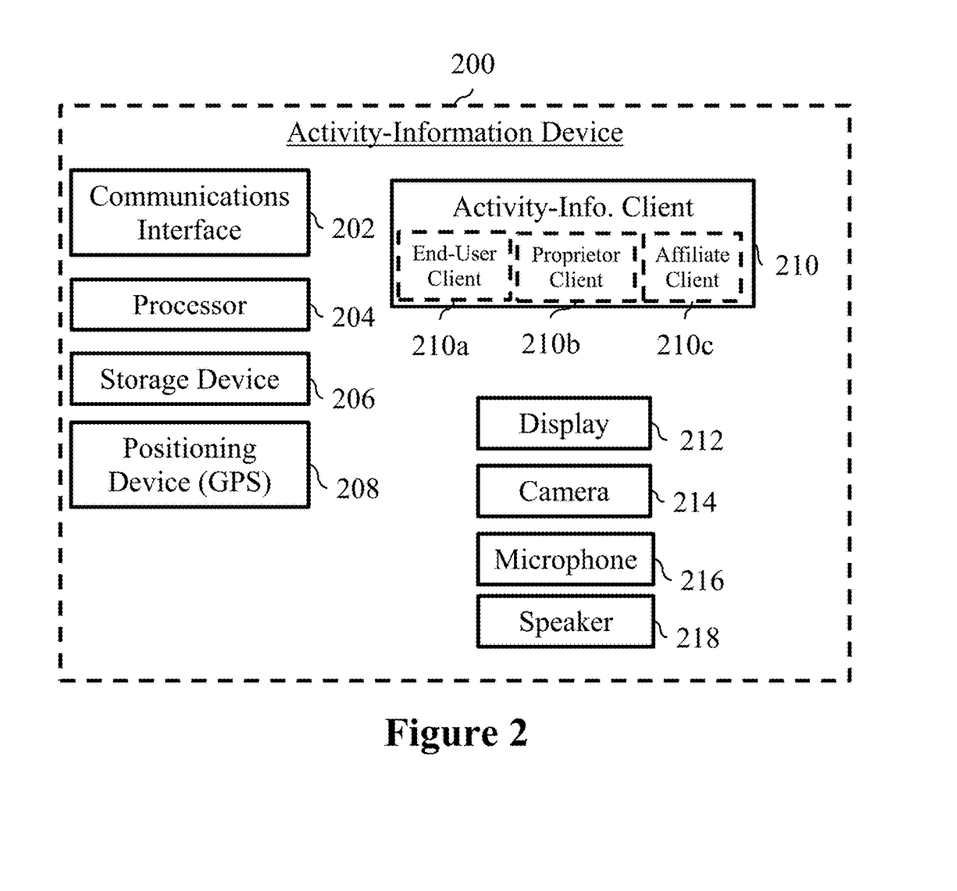
FIG. 2 is a block diagram of an exemplary embodiment of an activity-information device shown in FIG. 1 in accordance with principles of the present invention.

Referring to FIG. 2, activity-information device 200 is provided in accordance with a preferred embodiment of the present invention. Activity-information device 200 comprises the following hardware and software: communication interface 202 (e.g., Wi-Fi, Bluetooth, and Ethernet); processor 204; storage device (or memory) 206; positioning device 208 (e.g., GPS or network-based location); activity-information client 210; display 212; camera 214; microphone 216; speaker 218; and operating system (not shown). Activity-information client 210 may comprise one or more of end-user client 210a (for end-user device 200a), proprietor client 210b (for proprietor device 200b), or affiliate client 210c (for affiliate device 200c) depending on the type of activity-information device 200 the device is. Activity-information client 210 also includes functionality for providing an activity-information interface (see, e.g., FIG. 3). In a preferred embodiment, activity-information device 200 comprises software running on hardware, i.e., activity-information client 210 implemented as an application running on a smartphone (e.g., an Android™ device or an Apple iPhone™).

Activity-information device 200 detects and transmits activity information to activity-information server 100. Activity information provided may include the location of activity-information device 200 (thus the user), which may be provided by positioning device 208. In other embodiments, activity-information device 200 may determine whether the device (thus the user) is at a particular venue or within a district based on the location, and then transmit activity information indicative of the user's presence therein. In addition, activity-information device 200 may detect ambient noise and light levels using microphone 216 and camera 214, respectively, and may also be reported. Advantageously, the ambient noise and light levels may be detected when activity-information client 210 is in use (such as when a user is redeeming a coupon), thus, advantageously more accurate data may be provided. Such activity information is preferably detected and reported automatically, but may also be initiated manually by a user.

Activity-information device 200 may also report activity information manually entered by a user, more particularly by accessing the activity-information interface through activity-information client 210. Such manually-entered activity information includes, e.g.: length of line for entry at a bar, delay getting a table at a restaurant, number of patrons present at a venue, parking availability, etc. Similarly, a user may report activity information for a district, e.g.: number of people walking around a bar district, traffic along a strip, wait for taxis, or availability of parking. Additionally, a user may use activity-information device 200 to take pictures and video using camera 214, which may be transmitted (or uploaded) to activity-information server 100 using communications interface 202.

Activity-information device 200 preferably provides activity information with reference to a particular venue and/or district. The venue or district is preferably determined automatically based on location information provided by a positioning device 208 (i.e., GPS or network based detection), by manually entry by the user, or by other activity (e.g., redemption of a coupon at a particular venue). In other embodiments, activity-information server 100 may determine the relevant venue and district for received activity information based location information provided or other information (such as the redemption of a coupon at a venue or association of the device with a particular venue).

In the preferred embodiment, the above described activity-information may be provided by each type of activity-information device 200, i.e., end-user devices 200a, proprietor devices 200b, and affiliate device 200c. In other embodiments, only certain activity information is provided by each type of activity-information device 200.

More particularly, in certain embodiments, proprietor device 200b allows a proprietor of a venue (or their staff) to create new venues in activity-information repository 120 and to provide or report activity information about the proprietor's venue and surrounding district to activity-information server 100. Activity information providable by proprietor devices 200b includes, but is not limited to: number of patrons present; number of bars open; number of tables available and wait times; number of waiters/waitresses, bartenders, or staff on duty; parking information (e.g., valet wait times); expected crowds; and sales information. Such information may be manually input and reported using proprietor client 200b, or automatically reported through affiliate interface 130 by integration with a point-of-sale system or a reservation system. In addition, ambient noise and light levels at the venue may also be detected (i.e., using microphone 216 and camera 214, respectively) and reported automatically or manually. Additionally, proprietors may use proprietor device 200b to upload pictures and videos of venues and districts to activity-information server 100 through, e.g., using camera 214. Proprietors may also include additional activity information describing such pictures and video, such as "crowded," "seats available," etc. This activity information provided by proprietor client 200b is provided with reference to a particular venue. The venue may be determined automatically based on location information provided by positioning device (GPS) 208, manually entered by the proprietor, or determined based on the proprietor's registered venue.

In an alternate embodiment of the invention, proprietor device 200b is configured to be a "hot spot" that provides a wireless network connection to other devices (e.g., a Wi-Fi "hot spot"). When proprietor device 200b is so configured, preferably, proprietor client 210a automatically transmits connection information (e.g., SID and passphrase), or access credentials, associated with the hot spot to activity-information server 100. Alternatively, connection information may be manually inputted using activity-information interface and then transmitted. When activity-information devices 200 are within range of the hot spot, activity-information devices 200 detect the hot spot. Preferably, activity-information 210 (e.g., end-user client 210a) requests the connection information from activity-information server 100, which is then provided to activity-information device 200. Activity-information client 210 then automatically configures communication interface 202 of activity-information device 200 to connect to the hot spot. Each request for connection information may constitute activity information (i.e., presence of a user at the venue) from which activity-information server 100 may determine an activity level for the venue. Alternatively, proprietor device 200b transmits activity information comprising the number devices connected to the hot spot to activity-information server 100. In yet another embodiment, a networked-device (such as a router or computer) is used to perform all the functions of the proprietor device 200b. This embodiment provides an accurate count of activity-information device 200 present at the venue without the need for positioning device 208 being active. And, this embodiment advantageously provides user's with a network connection, thereby incentivizing user's activity-information system 10. That is, for example, it incentivizes users to install an activity-information client 210 (i.e., an application) on their smart phone.

Using activity-information interface of proprietor client 200b, proprietors may also create promotional items (e.g., for coupons and events), which are transmitted to activity-information server 100. Activity-information server 100 stores promotional items in activity-information repository 120 and may provide them to end-user devices 200a and affiliate devices 200c. For example, proprietor could create a promotional items for a coupon for end-users to receive $1 off drinks or for a promotion for college night or marketing a band performing at the venue (see, e.g., FIG. 3, reference numerals 340a, 340b, and 340c). Other promotional items could be designed to incentive third parties, e.g., a $1 cash incentive to taxi drivers to drop-off patrons at their venue.

Affiliate device 200c (comprising affiliate client 210c) may be used by affiliates or third-parties (such as taxi drivers or club promoters) to provide activity information to activity-information server 100. For example, a taxi company may be an affiliate and provide activity information regarding passenger drop-offs and pick-ups locations. Or, the taxi company may report locations of taxis using positioning device 208 or, alternatively, the presence of taxis at a particular venue or within a district. Using affiliate device 200c, affiliates may also manually provide information on crowd levels at a venue or within a district as described above.

In certain embodiments, such as where an affiliate is a promoter, affiliate device 200c reports ambient noise and light levels at a particular location (e.g., at a venue). Such activity information may be reported manually or automatically. An affiliate using affiliate device 200c (more particularly by accessing affiliate client 210c) may also manually input activity information, e.g.: length of line at a bar, delay getting a table at a restaurant, number of patrons present at a venue, or parking availability. In addition, an affiliate may report activity information for a district, e.g., number of people walking around a bar district, traffic along a strip, wait times for taxis, or availability of parking. Additionally, an affiliate may use affiliate device 200c to upload pictures and videos of venues and districts to activity-information server 100.

Activity information provided by affiliate device 200c is preferably provided with reference to a particular venue or district. The venue and/or district may be determined automatically based on location information provided by a positioning device 208, manually entered by the affiliate, or determined based other activity information (e.g., the affiliate being associated with a particular venue). Alternatively, activity-information server 110 may associate activity information providable from affiliate device 200c with a venue and/or district. Using affiliate device 200c, affiliates may also receive and redeem promotional items offered by proprietors.

Preferably, end-user devices 200a (comprising end-user client 210a) include functionality to automatically detect and report activity information comprising their the location of end-user device 200a (thus the user), which may be provided by positioning device 208. In other embodiments, end-user device 200a may determine whether the device (thus the user) is at a particular venue or within a district based on the location, and then transmit activity information indicative of the user's presence thereat. Activity information is detected and reported automatically or, in some embodiments, by manual entry by a user. In addition, the ambient noise and light levels may be detected using microphone 216 and camera 214, respectively, at a particular location (e.g., at a venue) may also be reported as described above. Activity-information client 210 preferably allows a user to disable automatic detecting and reporting of activity information.

End-user devices 200a preferably also include activity-information interface 300 for displaying activity information (including activity levels) as discussed below (see FIG. 3). In addition, using end-user client 210a, an end user may provide feedback (i.e., rate or evaluate) with respect to other activity information, which itself is activity information that is transmitted to activity-information server 100. For example, crowd levels reported by proprietors or purported pictures of a venue may be rated for accuracy or inaccuracy. This advantageously allows activity-information server 100 to more accurately weight the value of activity-information, thus more accurately determine activity levels as described below. And, this further protects the integrity of activity-information system 10. Thus, this also advantageously protects the integrity of activity-information system 10.

The operation of activity-information system 10 is now described with reference with FIGS. 1-3. Activity-information devices 200 detect and transmit activity information to activity-information server 100 as described above.

Preferably, activity-information device 200 provide user-identifying information (or information identifying the activity-information device) with activity information to activity-information server 100. Activity-information server 100 may use the identifying information to weight the activity information provided. In the preferred embodiment, activity-information server 100 automatically identifies "super" users and increases the weighting of activity information provided by such users. This is advantageous as certain users are socially active, and thus, presumed to patronize "hot" or popular venues. Activity-information server 100 may automatically identify frequent users or patrons frequently visiting venues automatically as "super" users based on their frequency of activity information received from their respective activity-information devices 200. Preferably, activity-information server 100 stores only total activity information provided by a user for identifying super users. But, it removes all identifying information from actual activity information provided before storing the "weighted" activity information in activity-information repository 120. In alternate embodiments, activity-information device 200 removes all identifying information from the activity information prior to transmission to activity-information server 100. Thus, activity-information system 10 advantageously mitigates users' privacy concerns.

Activity-information server 100 (more particularly server 110) receives the activity information and stores it in activity-information repository 120. Activity-information repository 120 is stored on a storage device(s), which may be one or more of a relational database, RDF repositories, file storage, etc. Storage device may be local or a cloud based system provided by a third-party. In the preferred embodiment, activity-information server 100 receives information from end-users devices 200a. In other embodiments, activity-information server 100 also advantageously receives activity information from affiliates devices 200c (e.g., taxi companies or promoters) and proprietor devices 200b (including their employees) who have less privacy concerns and desire to provide activity information for marketing purposes. Activity information may also be received from affiliate interface 130 directly from affiliate systems.

Activity-information server 100 automatically creates new districts and remaps existing districts as venues are added and removed and activity information indicates changing patterns of user behavior. Districts may be determined based on proximity of various venues. A district will typically comprises a group of venues within walking distance (in venue dense areas) and a short drive (in rural areas). The exact distance cutoffs may vary greatly by location, and may be modified by additional information. Geographic features (such as freeways, rivers, and greenbelts) may be considered by activity-information server 100 when defining districts. Optionally, patron movements between venues in the same night may be used to determine venues within the same districts, and thus better define districts. This may be determined by analyzing activity information showing locations and movements of activity-information devices 200. For example, frequent taxi pickups at one bar and drop at another nearby bar indicates the two bars should be in the same district.

Districts may also be predetermined. This is particularly useful in metropolitan areas where districts are well-known and well-defined. Examples of such well-known districts include: The Strip in Las Vegas, Nev.; Wrigley Field in Chicago, Ill.; Kirkwood Avenue in Bloomington, Ind.; Broad Ripple in Indianapolis, Ind.; Franklin Street in Chapel Hill, N.C.; Sixth Street in Austin, Tex.; and Uptown in Dallas, Tex. Similarly, business districts, where bars/restaurants tend to have a more happy hour crowd can similar be identified manually, or automatically based on substantial activity information being within typical happy hour times (i.e., Monday through Fridays between 5 pm to 8 pm).

In alternate embodiments, districts comprise sub-districts, which provide an additional level of granularity. In still other embodiments, districts may be grouped for purposes of displaying based on the zoom level being displayed by in activity-information interface 300 (see FIG. 3)

Venues may be manually added by system administrators or by end-users, proprietors, and affiliates using activity-information clients 210a, 210b, and 210c, respectively. In certain embodiments, only proprietor clients 210b may add new venues. In other embodiments, activity-information server 100 may be create venues automatically based on detecting relatively high activity information at a location. The location then may be cross-referenced with data related to the address to determine if it is a residential or commercial location area. Additional information about the potential venue then may be automatically retrieved from public sources (such as telephone directories) to determine if a venue should be added and provide information about the venue (e.g., name, phone number, official address, etc.). In certain embodiments, private venues may also be automatically created by activity-information server 100. For example, a particular apartment complex may be identified has a "hot" property and added as a private venue.

In the preferred embodiment, activity-information server 100 (more particularly server 110) processes relevant activity information received from activity-information devices 200 into activity parameters, which are stored in activity-information repository 120. The activity information may be weighted during the processing step. In alternate embodiments, activity-information devices 200 may perform processing and weighting of activity information. Next, activity-information server 100 determines activity-levels for venues and districts as described below. In alternate embodiments, activity-information server 100 performs weighting when determining activity levels.

A baseline activity level ($AL_b$), based on past or historical activity levels, is first determined. Preferably, past activity levels are stored in activity-information repository 120 and may be retrieved. Activity-information server 110 takes a weighted average of past activity information for the same day of the week at the same time. In addition, holiday information is considered. For example, for New Years Eve, Halloween, etc. the baseline activity level would be determined based on historical activity levels for the same holiday. Where a holiday is a fixed day of the week, e.g., the Wednesday before Thanksgiving, activity levels for the prior weeks are weighted lower than for the activity information for the previous holiday. On the other hand, where the holiday is a fixed date, e.g., July 4th or Halloween, the activity information for the prior weeks and the activity information for the previous holiday may be equally weighted. This is advantageous as patron activity often varies greatly depending on the day of the week that the holiday falls on. This is particularly relevant when such a holiday is not a government holiday and many people may have to work the next day. For example, when Halloween falls on a Saturday, activity-information server 100 would with predict higher activity levels than when Halloween falls on a Monday. In contrast, activity-information server 100 would predict that the patron activity for the Wednesday before Thanksgiving would be approximately the same as the year before.

Preferably, the baseline activity level is determined based on the following equation:

$$AL_w=[(n)AL_1+(n-1)AL_2 \ldots (1)AL_n]/[n(n+1)/2], \quad (1)$$

where $AL_w$=weekly baseline activity level, $AL_n$=activity level n weeks in the past, n=number of weeks to go back;

$$AL_h=(m)AL_1+(m-1)AL_2 \ldots (1)AL_m/[m(m+1)/2], \quad (2)$$

where $AL_h$=holiday baseline activity level, $AL_m$=activity level m holidays in the past, m=number of holidays to go back;

$$AL_b=[w_1AL_w+w_2AL_h]/[w_1+w_2], \quad (3)$$

where $AL_b$=baseline activity level, $w_1$=weekly baseline activity level weight, and $w_2$=holiday baseline activity level weight.

Preferably, n=10; m=3; $w_1$=1.0 (for non-holidays), 0.5 (for fixed-date holidays), or 0.2 (for fixed-day holidays); and $w_2$=0.0 (for non-holidays), 0.5 (for fixed-date holidays), or 0.8 (for fixed-day holidays). Other equations may also be used.

Activity-information server 100 then adjusts the baseline activity level based on real-time or current activity information ($AL_c$) provided by activity-information devices 200, preferably by taking a weighted average of the two values. Preferably, the current activity level ($AL_c$) is determined according to the following equations:

$$AL_c=[w_1AP_1+w_2AP_2+ \ldots +w_nAP_n]/[w_1+w_2+ \ldots +w_n], \quad (4)$$

where $AP_n$=an activity parameter; $w_n$=weight for $AP_n$.

An activity parameter refers to a sum or average of a particular type of activity information received for a particular venue over a particular time period, preferably the last one hour. For example, $AP_1$ could be an activity parameter for the number of people at a venue. It may be determined by totaling all activity-information devices 200 that provided location information within the last one hour that fell within the venue's geographic footprint. $AP_1$ may then be normalized or scaled. For example, the raw number of total users at the venue could be scaled to a value between 1 to 10 based on predetermined or dynamically determined thresholds (such as based on capacity of the venue). The weight, $w_1$, may be selected for scaling and importance of the activity-information data point. Preferably, the number of users present is weighted heavily. Further activity parameters are provided, i.e., for the other activity information provided by activity-information devices 200 as discussed herein. This includes activity level for the district a venue is in, actual numbers of patron in a district or at a venue, redemption of coupons, and the other information reported by users. Also, activity parameters for activity information reported by proprietors and affiliates are provided. Activity parameters for weather and traffic information may also be provided in certain embodiments.

Activity-information server 100 also weights activity information by relevance. In certain embodiment, end-users may rate activity information provided others. For example, a proprietor may pictures and video of his venue. If such is inaccurate, end-users may rate it so and activity-information server 100 then discounts such activity information provided by the proprietor and lowers the activity level for the venue.

In other embodiments, activity-information server 100 also weights activity information based on particular users, e.g., activity information from a "super" user will more heavily weighted. In other embodiments, other characteristics are used for weighting, such as gender, sexual preference, age, etc.

If activity information being received from a district or venue is less than past activity information, then the baseline activity level will be adjusted downwards. Similarly, if activity information being received from the district or venue indicates a higher activity level than expected, the base line activity level is adjusted upwards. This is advantageous as historical information alone will often fail to accurately predict the activity level. For example, if a weather event occurs (e.g., a snow storm) activity level may be much lower than historical activity information alone would predict. Or, a city wide event occurs (e.g., Super Bowl being held in the city) may occur that drastically increases activity levels. Often such activity effecting events have a disparate impact on venues, and as such, use of real-time activity information advantageously provides more accurate activity levels. Further, use of historical information is advantageous as real-time activity information may be limited, especially for rural area, and as such, historical activity information provides additional data points for more accurate prediction of activity levels.

Also, the activity level for a district will be adjusted based on all activity level within the district and venues therein. That is, an activity parameter corresponding to the district is provided when computing the current activity level for a venue within the district (see Equation 4, supra). Similarly, the activity level for a venue will be adjusted based on the activity level for the district.

In other embodiments, districts and venues may also have multiple activity levels. This is advantageous as certain districts and venue may have distinct clientele, such as based on sexual preference or age groups.

Activity-information server 100 thus computes in real-time activity levels for districts and venues. The term real-time as used herein means real-time or near real-time.

Activity-information server 100 preferably updates (if necessary) the real-time activity levels in real-time or at least once every 15 minutes. Activity-information server 100 may also generate predicted activity levels for a future time/date similarly as baseline activity levels are generated as described above. Activity-information server 100 preferably stores the activity levels in activity-information repository 120. In other embodiments, activity-information server 100 only computes activity levels when necessary (i.e., when a request for the venue/district is received from an activity-information device 200).

Activity-information devices 200 may request activity levels from activity-information server 100. The request may be for current, future (predicted), or past activity levels for a particular venue or district or generally for geographic region. When a request is received, activity-information server 100 retrieves (or generates) the appropriate activity levels and transmits the activity levels to the requesting activity-information device 200. In certain embodiments, activity-information server 110 may also provide activity information (such as number of patrons, wait-times, etc.) directly to activity-information devices 200, preferably upon request.

Figure 3:
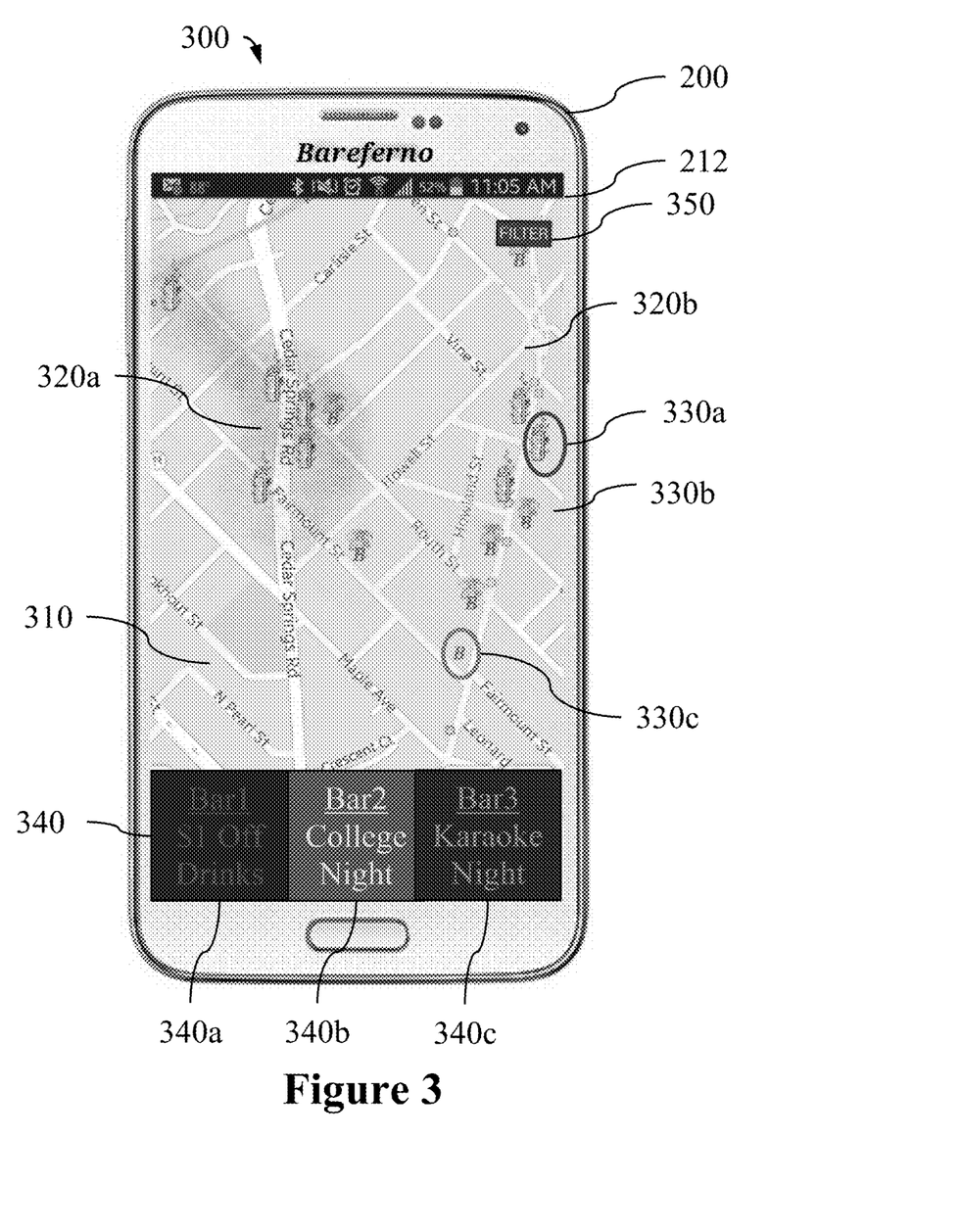
FIG. 3 is a front view of an exemplary embodiment of an activity-information interface exemplified being displayed on the activity-information device in accordance with principles of the present invention.

Referring more specifically to FIG. 3, a preferred embodiment of activity information interface 300 is exemplified being displayed on display 212 of activity-information device 200. Map 310 of a region is displayed. Map 310 is exemplified having activity levels for districts displayed as highlighting 320a and 320b and activity levels for venues displayed as icons 330a, 330b, and 330c. Districts with a high activity level are exemplified by red highlighting 320a; districts with moderate activity level are exemplified by yellow highlighting 320b; and districts with low to zero activity level are exemplified by no highlighting. Activity-information interface 300 displays icons 330 for venues, which may vary based on type of venue. "Hot" venues, i.e., with a high activity level, are exemplified by icons with flames 330a; venues with moderate activity levels are exemplified by icons with smoke 330b; and venues with low to zero activity level are exemplified by icons with snowflakes or without any emphasis 330c. Other means for differentiating between activity levels may be used without departing from the spirit of the invention.

Preferably, activity levels have more values (e.g., 0 to 100) than may be distinctly displayed. In which case, activity-information client 210 may determine the appropriate display characteristics based on predetermined thresholds. Preferably, activity-information client 210 may determine the thresholds dynamically, e.g., based on number of venues/districts being displayed within activity-information interface 300. For example, icons with flames 330a may be displayed only for the top 10% of venues based their activity levels within display 212. In other embodiments, distinct values for an activity level (e.g., 1, 2, or 3) may correspond on a one-to-one basis to the number of distinct displayable icons/highlighting.

Promotion and coupons may also be displayed in promotional display area 340. Promotional item 340a, 340b, and 340c exemplify three such promotional items. A user may select such promotional items to redeem them.

The number of, and manner in which, districts and venues displayed are preferably dependent on the zoom level of the map and available data. For example, at a high-zoom level, only districts may be display and venues are omitted, or districts may be grouped for display purposes. On the other hand, at low-zoom levels, venues and sub-districts may be displayed, or districts highlighting may be omitted altogether.

Preferably, filter button 350 is provided within activity-information interface 300. Using filter button 350, a user may filter or restrict the venues and districts displayed within activity-information interface 300. For example, a user may choose display only night clubs or only restaurants.

Activity-information system 10 has numerous advantages over conventional systems. Activity-information system 10 advantageously uses real-time information and thus provides more accurate information regarding patron activity levels. Activity-information system 10 also advantageously uses information from many sources. Advantageously, such sources of activity information includes proprietors and affiliates who are incentivized to provide activity information. As such, activity-information system 10 is not solely reliant on end-user reported activity information, which may be limited by privacy concerns among other reasons.

In yet other embodiments, user identifying information is removed before transmission or removed by activity-information server 100 prior to storage in activity-information repository 120. Thus, activity-information system 10 advantageously assuages users' privacy concerns.

It is understood that the present invention may take many forms and embodiments. Accordingly, several variations may be made in the foregoing without departing from the spirit or the scope of the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A activity-information system comprising:
   an activity-information repository configured for storing activity information related to a plurality of venues, a plurality of districts, or both;
   an activity-information server communicatively coupled to the activity-information repository, the activity-information server being configured for determining activity levels for the plurality of venues, the plurality of districts, or both;
   wherein the activity-information server is further configured to:
      receive activity information from activity-information devices,
      store the received activity information in the activity-information repository,
      update, if necessary, the activity levels in real-time, and
      transmit the activity levels to activity-information devices; and
   wherein the activity-information server is further configured to:
      store access credentials associated with hot spots at the plurality of venues, the plurality of district, or both in the activity-information repository,
      receive requests for access credentials from activity-information devices, transmit to activity-information devices access credentials responsive to the requests for access credentials, and update activity levels at least in part based on the number of requests received for access credentials.

2. A activity-information system comprising:

an activity-information repository configured for storing activity information related to a plurality of venues, a plurality of districts, or both;

an activity-information server communicatively coupled to the activity-information repository, the activity-information server being configured for determining activity levels for the plurality of venues, the plurality of districts, or both;

wherein the activity-information server is further configured to:

receive activity information from activity-information devices, store the received activity information in the activity-information repository, update, if necessary, the activity levels at least every 15 minutes, and transmit the activity levels to activity-information devices; and wherein the activity-information server is further configured to:

store access credentials associated with hot spots at the plurality of venues, the plurality of district, or both in the activity-information repository, receive requests for access credentials from activity-information devices, transmit to activity-information devices access credentials responsive to the requests for access credentials, and update activity levels at least in part based on the number of requests received for access credentials.

* * * * *